(12) United States Patent
Hirota et al.

(10) Patent No.: US 6,985,353 B2
(45) Date of Patent: Jan. 10, 2006

(54) ANODE BODY FOR SOLID ELECTROLYTIC CAPACITOR AND SOLID ELECTROLYTIC CAPACITOR USING THE SAME

(75) Inventors: Kiyoshi Hirota, Osaka (JP); Koichi Kojima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 16 days.

(21) Appl. No.: 10/621,064

(22) Filed: Jul. 16, 2003

(65) Prior Publication Data
US 2004/0136144 A1 Jul. 15, 2004

(30) Foreign Application Priority Data
Jul. 10, 2002 (JP) ............................. 2002-200974
Sep. 11, 2002 (JP) ............................. 2002-265106

(51) Int. Cl.
*H01G 9/04* (2006.01)
*H01G 5/013* (2006.01)

(52) U.S. Cl. ........................ 361/528; 361/524; 361/532

(58) Field of Classification Search ......... 361/523–541
See application file for complete search history.

(56) References Cited

U.S. PATENT DOCUMENTS

| | | | |
|---|---|---|---|
| 6,038,124 A * | 3/2000 | Uchi et al. | 361/509 |
| 6,185,091 B1 * | 2/2001 | Tanahashi et al. | 361/529 |
| 6,320,742 B1 * | 11/2001 | Wada et al. | 361/528 |
| 6,400,556 B1 * | 6/2002 | Masuda et al. | 361/523 |

FOREIGN PATENT DOCUMENTS

JP 2000-306782 11/2000

* cited by examiner

Primary Examiner—Eric W. Thomas
(74) Attorney, Agent, or Firm—RatnerPrestia

(57) ABSTRACT

A solid electrolytic capacitor having a lowered leakage current characteristic and an improved ESR characteristic; which has been implemented by decreasing the defects contained in the dielectric film of the anode body. It includes a valve metal foil which makes anode and a sintered layer provided on the upper and lower surfaces of the valve metal foil, which sintered layer covering the entire surface of side faces of valve metal foil in three directions with exception of the anode lead portion. A flat plane area of valve metal foil, which makes anode, covered with sintered layer is not less than one half of the flat plane area of sintered layer.

1 Claim, 6 Drawing Sheets

FIG. 10A
PRIOR ART
FIG. 10B
PRIOR ART
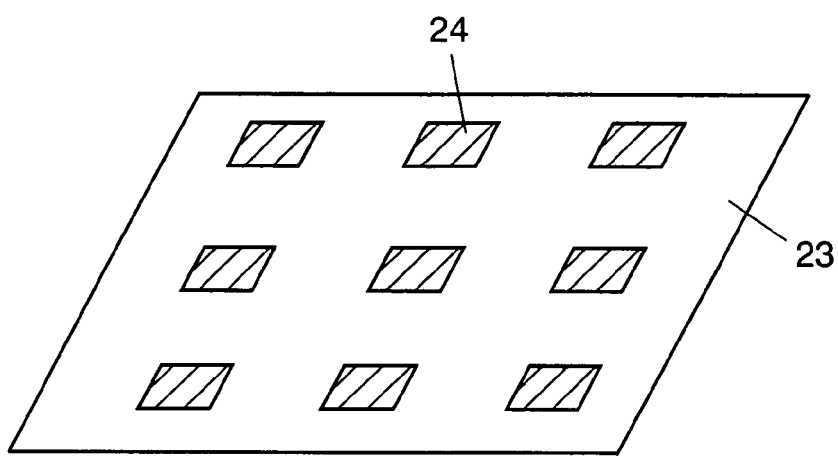
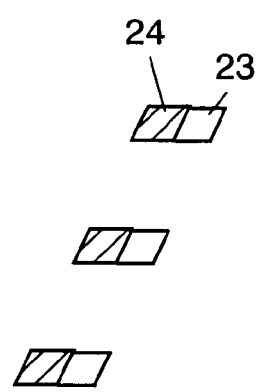
FIG. 11   PRIOR ART
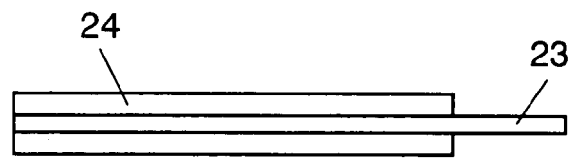

ANODE BODY FOR SOLID ELECTROLYTIC CAPACITOR AND SOLID ELECTROLYTIC CAPACITOR USING THE SAME

FIELD OF THE INVENTION

The present invention relates to an anode body for solid electrolytic capacitor used in various kinds of electronic apparatus, and a solid electrolytic capacitor using the anode body.

BACKGROUND OF THE INVENTION

FIG. 8A shows cross sectional view of a conventional capacitor element of solid electrolytic capacitor (hereinafter referred to as SEC); FIG. 8B shows front view of the capacitor element. As shown in FIG. 8A, porous anode body 15 is provided by sintering a molded body of valve metal powder, and anode lead wire 16 is buried in anode body 15 with one end protruding out. Outer surface of anode body 15 is covered with dielectric film 17, solid electrolytic layer 18 and cathode layer 19, laminated in the order, to complete a finished capacitor element 14. FIG. 9 shows cross sectional view of a laminate type SEC, which includes conventional capacitor elements 14 stacked for three pieces. As illustrated in the drawing, a plurality of capacitor elements 14 is stacked in the same directional orientation.

Anode lead wire 16 of each capacitor element 14 is connected to external anode terminal 21A. Cathode layer 19 is connected to external cathode terminal 21B. Respective anode leads 16 are connected together with electrical connection member 20. Finally, the entire structure of laminated capacitor elements 14 is covered with insulating resin 22 to make a finished capacitor.

Japanese Patent Laid-Open Application No.2000-306782 discloses a method of providing a thin anode body 15. In the first place, sintered layer 24 is formed on the upper and lower surfaces of valve metal foil 23 which makes anode, as shown in FIG. 10A. Next, sintered layer 24 is stamped out to include valve metal foil 23 which makes anode lead portion, as shown in FIG. 10B. A thin anode body can be manufactured in this way. In a thin anode body for SEC thus manufactured, however, sintered layer 24 formed on valve metal foil 23 which makes anode has been sectioned together with valve metal foil 23 which makes anode lead portion.

As the result, as shown in FIG. 11, the stamped sectional surface has valve metal foil 23 exposed therein. When a dielectric film is provided by anode oxidation, that formed on valve metal foil 23 exposed in the sectioned surface has more defects, as compared with that formed on the surface of sintered layer 24. In the succeeding step of forming a solid electrolyte, the defect portion will have solid electrolyte, which may well be lead to a direct contact with valve metal foil 23. Consequently, the leakage current (LC) tends to increase; in the extreme cases, it resorts to short circuiting. Meanwhile, in the configuration as shown in FIG. 8A and FIG. 8B, where anode lead wire 16 has been buried in anode body 15, volume of anode lead wire 16 is small in relation to that of anode body 15. In the configuration as shown in FIG. 10A and FIG. 10B, where sintered layer 24 is formed on the outer surface of valve metal foil 23, volume of anode lead portion 23 is small in relation to that of sintered layer 24. Consequently, conventional SECs containing the above-described elements have another problem of high ESR (Equivalent Series Resistance) characteristic. Included among the important electrical characteristics with SECs are leakage current, ESR, ESL (Equivalent Series Inductance), etc. The present invention aims to offer an anode body for SEC which is superior in, among other important characteristic items, the leakage current characteristic and the ESR characteristic; and a SEC using the anode body.

SUMMARY OF THE INVENTION

A solid electrolytic capacitor having an anode body for solid electrolytic capacitor, which anode body includes a valve metal foil which makes anode and a layer of sintered body of valve metal provided on the upper and the lower surfaces, respectively, of the valve metal foil, and the sintered layers of valve metal formed on both the upper and the lower surfaces of valve metal foil cover the entire side faces in three directions with exception of anode lead portion of valve metal foil.

A solid electrolytic capacitor having an anode body for solid electrolytic capacitor, which anode body includes a valve metal foil which makes anode and a layer of sintered body of valve metal provided to cover the valve metal foil with exception of anode lead portion, and a flat plane area of the above-described valve metal foil covered with the sintered layer is not less than one half that the flat plane area of sintered layer.

BRIEF DESCRIPTION OF THE DRAWINGS

FIG. 10A and FIG. 10B show perspective views used to describe a method of manufacturing conventional anode bodies for use in SEC.

FIG. 11 shows side view of a conventional anode body for SEC.

DESCRIPTION OF THE PREFERRED EMBODIMENTS

Figure 1:
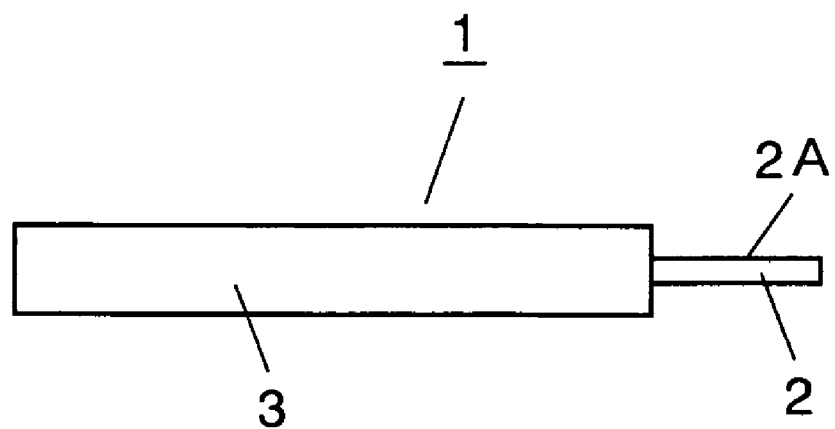
FIG. 1 shows front view of an anode body for SEC in accordance with a first exemplary embodiment of the present invention.

A solid electrolytic capacitor (SEC) in exemplary embodiments of the present invention is described referring to the drawings. The drawings have been prepared for the purpose of presenting the concepts, they are not aimed to exhibit precise relative location or dimensions.

(Embodiment 1)

Figure 2:
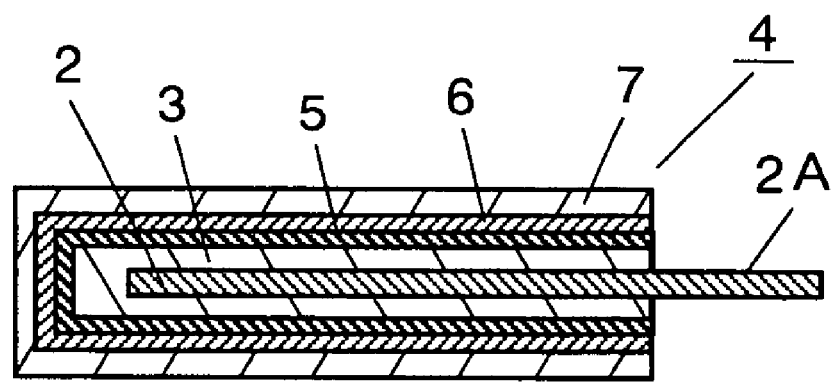
FIG. 2 shows cross sectional view of a SEC element using the anode body for SEC in accordance with embodiment 1.

The valve metal foil and the valve metal powder in the present embodiment use tantalum. FIG. 1 shows anode body 1 formed of valve metal foil 2 and layer 3 of sintered body of valve metal powder. Sintered layer 3 covers the entire surface of valve metal foil 2, excluding anode lead portion 2A. FIG. 2 shows capacitor element 4 containing above-described anode body 1. Capacitor element 4 is formed by providing dielectric film 5, solid electrolytic layer 6 and cathode layer 7, laminated in the order, on the outer surface of sintered layer 3. Cathode layer 7 consists of a carbon layer and a silver paste layer.

A method of manufacturing the above-configured anode body 1 for SEC is described below, and a capacitor element 4 using the anode body as well.

Valve metal foil 2 is stamped out to a certain specific element shape; one end of the stamped out piece forming anode lead portion 2A. It is covered with a paste of tantalum powder and binder, excluding anode lead portion 2A. After removing the binder, it is sintered in vacuum to form sintered layer 3. Thus anode body 1 for SEC is manufactured. And then, anode body 1 is anode-oxidized in phosphoric acid solution to provide dielectric film 5 on the surface of valve metal foil 2 and sintered layer 3. Further on the surface of dielectric film 5, solid electrolytic layer 6 is provided through either one of the following methods. One method is dipping anode body 1 in manganese nitrate solution and pull it out of the solution for thermal decomposition to form solid electrolytic layer 6 of manganese dioxide. The other method is polymerizing pyrrole monomer or the like conductive polymer material by a known process, to provide solid electrolytic layer 6 of polypyrrole, etc. On the surface of solid electrolytic layer 6 thus provided, a carbon layer and a silver paste layer are laminated in the order to form cathode layer 7. Capacitor element 4 is manufactured through the above-described procedure. Finally, anode lead portion 2A and cathode layer 7 of capacitor element 4 are connected respectively with an external anode terminal and an external cathode terminal. The entire structure of SEC element 4 is covered with an insulating resin to complete a finished SEC.

Figure 3:
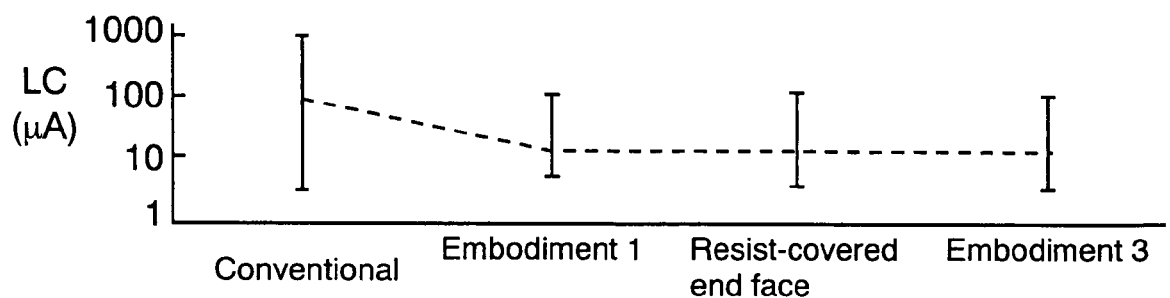
FIG. 3 is a characteristic chart showing the leakage current in a SEC which contains the anode body for SEC in embodiment 1.

FIG. 3 compares SEC in the present embodiment 1 and conventional SEC (end face of the sectioned valve metal foil is exposed) with respect to the leakage current (LC). SEC whose end face of sectioned valve metal foil 2 is covered with sintered layer 3 exhibits an improved leakage current characteristic with the leakage current significantly decreased, as compared with that of conventional SEC whose end face of sectioned valve metal foil 2 is exposed uncovered. Namely, when end face of valve metal foil 2 is covered with sintered layer 3, the end face of which is provided with an appropriate surface roughness. Dielectric film 5 formed thereon includes least defect in the film. This contributes significantly to the improvement in the leakage current characteristic. In FIG. 3, the item "Resist-covered end face" represents those whose end face of valve metal foil 2, exposed as the result of sectioning, is covered with a resist material. This configuration is also effective for improving the leakage current characteristic. The exposed end face as referred to in the present invention means the three end faces, with the exception of anode lead portion 2A side among those exposed as the result of sectioning. The end face of valve metal foil 2 exposed as the result of sectioning can be roughened also by blasting or the like process to eliminate the smooth surface therefrom. By so doing, a dielectric film can be made to be less vulnerable to a possible damage due to stress caused during the film formation. As a result, dielectric film 5 becomes stable in the shape, and solid electrolytic layer 6 formed on dielectric film 5 ensures a superior leakage current characteristic with a finished solid electrolytic capacitor. Although tantalum is used for valve metal foil 2 and valve metal powder in the present embodiment 1, it is not the intention of the present invention to limit the material to tantalum. Other valve metal selected from among the group of tantalum, niobium and a tantalum-niobium alloy offers the same functions and effects.

(Embodiment 2)

Now in the present embodiment 2, a structure where a plurality of capacitor elements 4 of embodiment 1 is stacked together is described. Those parts identical to those of embodiment 1 are represented by the same symbols, and detailed description on which parts is eliminated. Only those different parts are described referring to the drawings.

Figure 4:
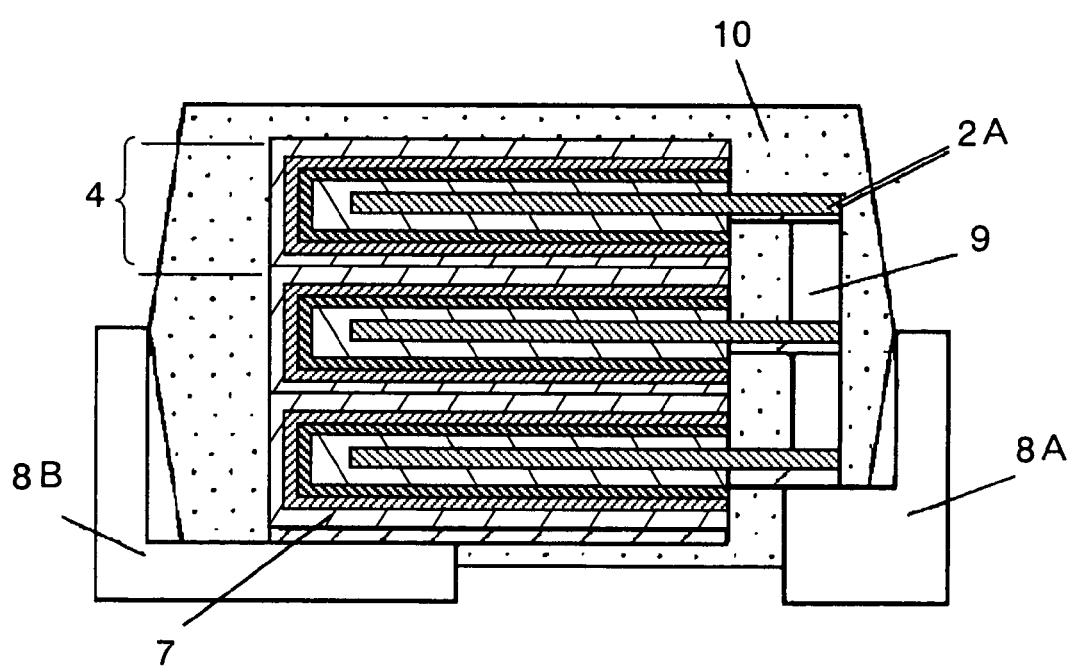
FIG. 4 shows cross sectional view of a SEC in accordance with a second exemplary embodiment of the present invention.

Referring to FIG. 4, capacitor element 4 is stacked for three pieces in embodiment 2. Respective capacitor elements 4 are connected together with a conductive adhesive (not shown). Anode lead portion 2A of valve metal foil 2 protruding from capacitor element 4 is connected to external anode terminal 8A. Cathode layer 7 is connected to external cathode terminal 8B. Anode lead portion 2A of each valve metal foil 2 is connected to each other by electrical connection member 9. The entire structure of the three capacitor elements 4 stacked together is covered with insulating resin 10. Thus, a SEC in the present embodiment 2 is the one which includes thin capacitor element 4 of embodiment 1 stacked together for three pieces, which element having an improved leakage current characteristic. As the result, both the slim contour and the large capacitance stand together in a SEC thus manufactured, and it exhibits superior performance, the leakage current is small and the ESR is also small.

(Embodiment 3)

Figure 5:
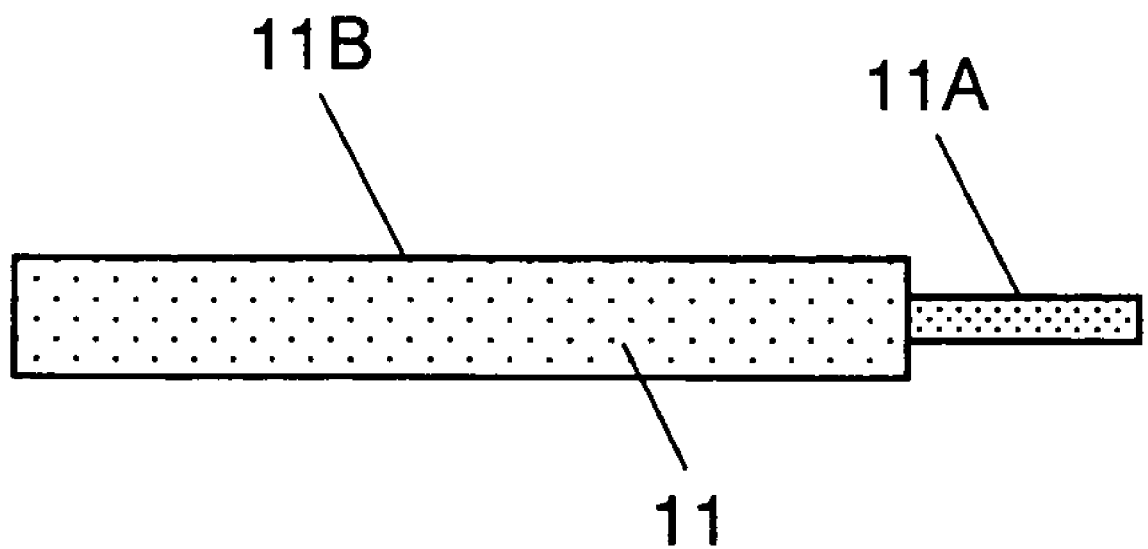
FIG. 5 shows front view of an anode body for SEC in accordance with a third exemplary embodiment of the present invention.

A method of manufacturing anode body 11 for SEC formed of porous tantalum is described, referring to FIG. 5. The process of manufacturing anode body 11 remains the same as that in embodiment 1, except that in the present embodiment 3 a porous tantalum foil (can be a plate) is used in place of the valve metal foil (tantalum foil). The porous tantalum can be a foam metal or a sponge metal. Then, anode body 11 is separated at a certain specific place into cathode forming portion 11B which realizes a capacitance and anode lead portion 11A. The separating treatment is conducted by press-crushing the whole of anode lead portion 11A, or only the boundary place, for smoothening. Further, the boundary face of the earlier-described cathode forming portion 11B to anode lead portion 11A is applied with a resist material (not shown). In this way, the porous portion is put into a separation (discontinuation). As for the resist material, any insulating resin may be used. Thus, a possible contamination on anode lead portion 11A by cathode material during a later process step and the resultant short circuit trouble can be prevented. Anode body 11 in the present embodiment 3 is thus manufactured. In the same way as in embodiment 1, a capacitor element is manufactured using the above anode body 11. A SEC is provided by a plurality of the capacitor elements stacked together. Since anode body 11 for SEC in the present embodiment 3 uses porous tantalum, a dielectric film of high adhesive property can be formed at the three end faces of anode body 11. Consequently, a solid electrolytic layer formed on the dielectric film is provided with a good stability. This helps implementing a SEC of superior leakage current characteristic.

Leakage current characteristic of a SEC in accordance with the present embodiment 3 is shown in FIG. 3. FIG. 3 indicates that the leakage current characteristic has been significantly lowered and improved, as compared with that of conventional samples. Namely, the configuration having no smooth surface in the end face of anode body 11 contributes a lot to the improvement in the leakage current characteristic.

The same advantage can be realized by forming sintered layer 3 of tantalum metal powder to cover the upper and the lower surfaces of cathode forming portion 11B of anode body 11, in the same manner as in embodiment 1.

It is not the intention of the present invention to limit the porous valve metal to tantalum.

(Embodiment 4)

The present embodiment is described with focus on those points of difference from embodiment 1.

Figure 6A:
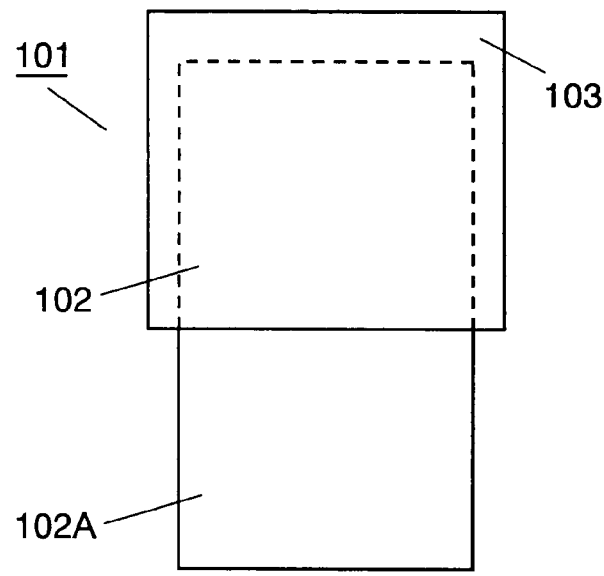
FIG. 6A shows plan view of an anode body for SEC in accordance with a fourth exemplary embodiment of the present invention.
Figure 6B:
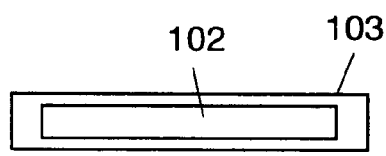
FIG. 6B shows front view of the anode body for SEC in embodiment 4.

As shown in FIG. 6A and FIG. 6B, anode body 101 is formed of tantalum metal foil 102, the entire surface of which being covered, excluding anode lead portion 102A, with sintered layer 103 of tantalum metal powder.

In the above configuration, it satisfies at least one of the following requirements; that a flat plane area of valve metal foil 102 covered by sintered layer 103 is not less than one half of the flat plane area of sintered layer 103, and that a cross sectional area of anode lead portion 102A is not less than 10% of the cross sectional area of sintered layer 103. A SEC is manufactured, in the same manner as in embodiment 1, using this anode body 101 for solid electrolytic capacitor.

SEC thus manufactured is compared in terms of the ESR characteristic. The SEC in embodiment 1 has the structure where the flat plane area of valve metal foil 2 covered by sintered layer 3 is not less than one half of the flat plane area of sintered layer 3, and the cross sectional area of anode lead portion 2A of valve metal foil 2 is 10% of the cross sectional area of sintered layer 3. The SEC in embodiment 2 has the structure where the cross sectional area of anode lead portion 2A of valve metal foil 2 has been increased to a ratio of 30% to that of sintered layer 3. The conventional SEC has the structure where it includes a porous sintered body of valve metal powder mold, containing an anode lead wire buried therein so that one end of the wire protrudes out. These SECs were compared with respect to the ESR characteristic, the results of comparison are shown in (Table 1).

As it is clear from (Table 1), it is preferred that at least either one of the following requirements is satisfied; that a flat plane area of valve metal foil 102 covered by sintered layer 103 is not less than one half of the flat plane area of sintered layer 103, and that a cross sectional area of anode lead portion 102A is not less than 10% of the cross sectional area of sintered layer 103. By so doing, the junction of valve meal foil 102 making anode and sintered layer 103 is ensured. Furthermore, since the contact area of valve metal foil 102 in anode lead portion 102A and sintered layer 103 is increased, a SEC is provided with lowered ESR and improved high frequency response. In addition, if cross sectional area of anode lead portion 2A is further increased, as in embodiment 2, ESR can be lowered a step further. Consequently, the high frequency response is further improved.

TABLE 1

|  | Embodiment 1 | Embodiment 2 | Conventional |
| --- | --- | --- | --- |
| Valve metal foil shape | Not less than 1/2 of sintered body area (foil) | Not less than 1/2 of sintered body area, cross sectional area 2 times as large (foil) | Less than 1/2 of sintered body area (wire) |
| Cross-sectional-area ratio | 10 | 30 | 0.1 |
| ESR mΩ (100 kHz) | 40 | 20 | 120 |
| CV/g | 80000 | 80000 | 80000 |

Although the valve metal foil and valve metal in the present embodiment 4 use tantalum, it is not the intention of the present invention to limit the material to tantalum. Other valve metal selected from among the group of tantalum, niobium and a tantalum-niobium alloy provides the same functions and effects. Or, a combination of the above may be used.

(Embodiment 5)

Figure 7:
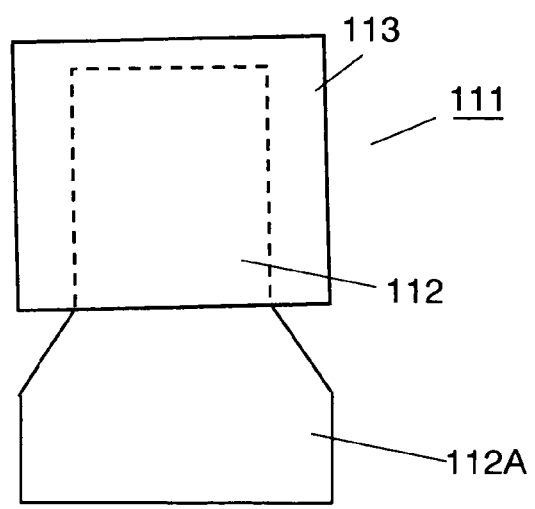
FIG. 7 shows front view of an anode body for SEC in accordance with a fifth exemplary embodiment of the present invention.
Figure 8A:
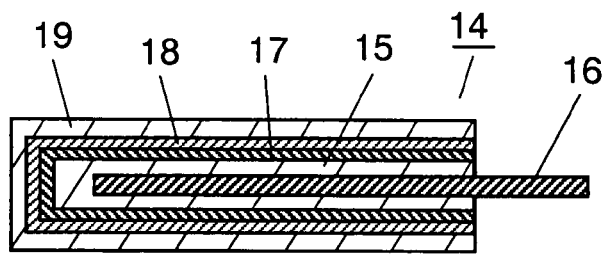
FIG. 8A shows cross sectional view of a capacitor element used in a conventional SEC.
Figure 8B:
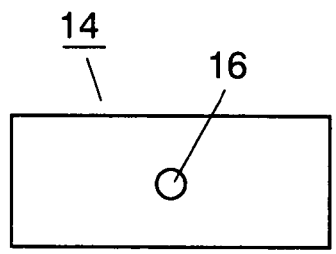
FIG. 8B shows front view of the conventional capacitor element.
Figure 9:
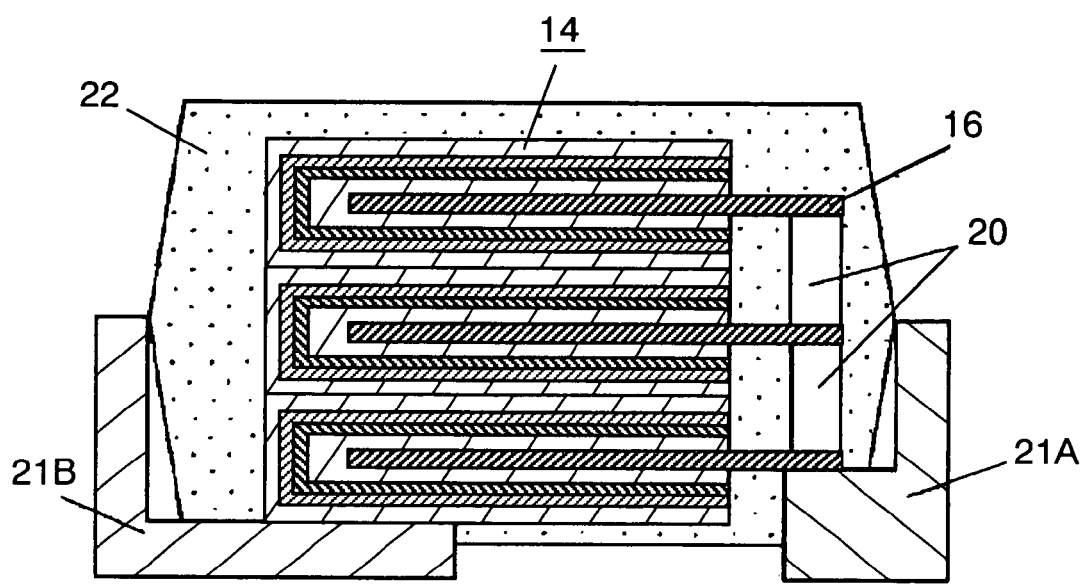
FIG. 9 shows cross sectional view of a conventional SEC having a plurality of capacitor elements stacked.

Reference is made to FIG. 7, anode body 111 is formed of tantalum metal foil 112 the entire surface of which being covered, excluding anode lead portion 112A, with sintered layer 113 of tantalum metal powder.

The flat plane area, and the cross sectional area, of anode lead portion 112A of valve metal foil 112, which makes the above-described anode body 111, have at least the same square measure as the corresponding areas of valve metal foil 112 covered with sintered layer 113. Namely, it is shaped so that area of anode lead portion 112A of valve metal foil 112 extruding from sintered layer 113 does not decrease.

With the anode body thus shaped, the ESR of a SEC can be lowered since there is no decrease in the area of anode lead portion 112A.

As described in the above, an anode body for SEC in accordance with the present invention, as well as a SEC containing the anode body, have no smooth surface in the dielectric film provided on the end face of anode body. As a result, dielectric film becomes stable in the shape, and solid electrolytic layer formed on the dielectric film ensures an improved leakage current characteristic with a finished SEC.

Furthermore, the above-described configuration is satisfying at least one of the following requirements; that a flat plane area of valve metal foil covered by sintered layer is not less than one half of the flat plane area of sintered layer, and that a cross sectional area of anode lead portion is not less than 10% of the cross sectional area of sintered layer.

As a result, the junction of valve metal foil making anode and sintered layer can be ensured. Furthermore, since the contact area of valve metal foil in the anode lead portion and sintered layer has been increased, a finished SEC provides a lowered ESR and a superior high frequency response.

What is claimed is:

1. An anode body for a solid electrolytic capacitor comprising
   a valve metal foil which makes an anode, and
   a layer of sintered body formed of said valve metal covering said valve metal foil with exception of an anode lead portion, wherein
   a ratio of cross sectional area of said anode lead portion of said valve metal foil to that of the layer of sintered body is not less than 10%.

* * * * *